(12) United States Patent   (10) Patent No.: US 9,189,311 B2
Li et al.   (45) Date of Patent: Nov. 17, 2015

(54) REBUILDING A STORAGE ARRAY

(71) Applicant: International Business Machines Corporation, Armonk, NY (US)

(72) Inventors: Chuan Li, Shanghai (CN); Hai Bo Qian, Shanghai (CN); Fang Xie, Shanghai (CN); Bo Zou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 14/163,288

(22) Filed: Jan. 24, 2014

(65) Prior Publication Data

US 2014/0215262 A1   Jul. 31, 2014

(30) Foreign Application Priority Data

Jan. 29, 2013   (CN) .......................... 2013 1 0034811

(51) Int. Cl.
*G06F 11/00* (2006.01)
*G06F 11/07* (2006.01)
*G06F 11/10* (2006.01)

(52) U.S. Cl.
CPC ........ *G06F 11/0727* (2013.01); *G06F 11/1088* (2013.01); *G06F 11/1092* (2013.01)

(58) Field of Classification Search
CPC ............ G06F 11/0727; G06F 11/1088; G06F 11/1092
See application file for complete search history.

(56) References Cited

U.S. PATENT DOCUMENTS 5,357,509 A * 10/1994 Ohizumi ...................... 714/6.32
7,721,143 B2   5/2010 Humlicek
2007/0088990 A1* 4/2007 Schmitz ........................ 714/700
2007/0101187 A1* 5/2007 Daikokuya et al. ............... 714/6
2008/0126839 A1* 5/2008 Sangapu et al. .................. 714/5
2008/0178040 A1* 7/2008 Kobayashi ........................ 714/6
2008/0209263 A1* 8/2008 Settle et al. ...................... 714/6
2012/0096309 A1   4/2012 Kumar et al.
2012/0198273 A1   8/2012 Ishikawa et al.
2012/0254534 A1* 10/2012 Huang .......................... 711/114
2013/0086316 A1* 4/2013 Shah et al. .................... 711/113

FOREIGN PATENT DOCUMENTS

CN   102495680 A   6/2012
CN   102521067 A   6/2012

OTHER PUBLICATIONS

IBM, "Method of Spare Rotation to Extend SSD Life in RAID Subsystem While Maintaining Data Redundancy," IPCOM000212661D, IP.com Prior Art Database Technical Disclosure, Nov. 22, 2011.

* cited by examiner

*Primary Examiner* — Yolanda L Wilson
(74) *Attorney, Agent, or Firm* — James R. Nock (57) ABSTRACT

The present invention discloses a method and apparatus for rebuilding a storage array. The method comprises: replacing, in response to a failing storage device occurs in the storage array, the failing storage device with a first spare storage device; performing component rebuild by using other storage devices in the storage array than the first spare storage device, so as to restore within the first spare storage device data in the failing storage device; performing, in parallel with the component rebuild, smart rebuild by using a second spare storage device, so as to copy data in the failing storage device to the second spare storage device; replacing the first spare storage device with the second spare storage device in the storage array upon completion of the smart rebuild.

20 Claims, 5 Drawing Sheets

REBUILDING A STORAGE ARRAY

BACKGROUND OF THE INVENTION

The present invention relates to storage array, and more specifically, to a method and apparatus for rebuilding a storage array.

With the rapid development of Information Technology, the amount of data that needs to be stored and processed becomes larger and larger. For this reason, in addition to the increasing of storage density and storage capacity of individual storage devices, a storage array formed by a plurality of storage devices is often employed to store data. Typically, a storage array is formed by a plurality of independent non-volatile storage devices such as disk, SSD, etc; these storage devices are collectively connected to a storage array controller and perform operation related to data storage under control of the controller.

On the other hand, to ensure security of the stored data, certain redundancy is often provided in a storage array, such that data recovery can be conducted when corruption occurs in a portion of data. Such storage array is also referred to as Redundant Disk Array (RAID). Multiple levels of RAID have been provided in the art.

RAID 1 is also referred to as Disk Mirroring Array. In such an array, when data is stored on a primary disk, same data is also written to a mirroring disk. When the primary disk fails, the mirroring disk will take the place of the primary disk. Data security of RAID 1 is the highest among all the RAID levels since there is a mirroring disk to perform full data backup. However, it is appreciated that, disk utilization of RAID 1 is relatively low.

RAID 2 encodes data by Error Correction Code (ECC), then partitions the encoded data into separate bits, and writes them to disks. RAID 3 and RAID 4 further utilize data interleaving storage technology to partition the encoded data, store them to disks respectively, and store parity data of different bits in a separate disk.

RAID 5 is a storage solution that comprehensively considers storage performance, data security and storage cost in balance. RAID 5 improves parallelism of data access by stripping the data and distributing data stripes to different storage devices. Specifically, in RAID 5, data and corresponding parity information are stored to respective disks forming RAID 5, and parity information and corresponding data are stored on different disks respectively. Since RAID 5 uses one parity chunk in each stripe to store parity information, RAID 5 can tolerate failure of one disk. That is to say, when data in one disk corrupts, the corrupted data can be restored by using data and corresponding parity information in the remaining disks. Since RAID 5 takes both data security and storage cost in consideration, it is widely applied.

RAID 6 improves data security by increasing number of parity chunks in each stripe to two. Accordingly, RAID 6 can tolerate failure of two disks at the same time. Moreover, other levels of Redundant Disk Array such as RAID 10 and RAID 50 are also provided, which possess their own features in different aspects such as data security, disk utilization, read/write speed etc.

Figure 1A:
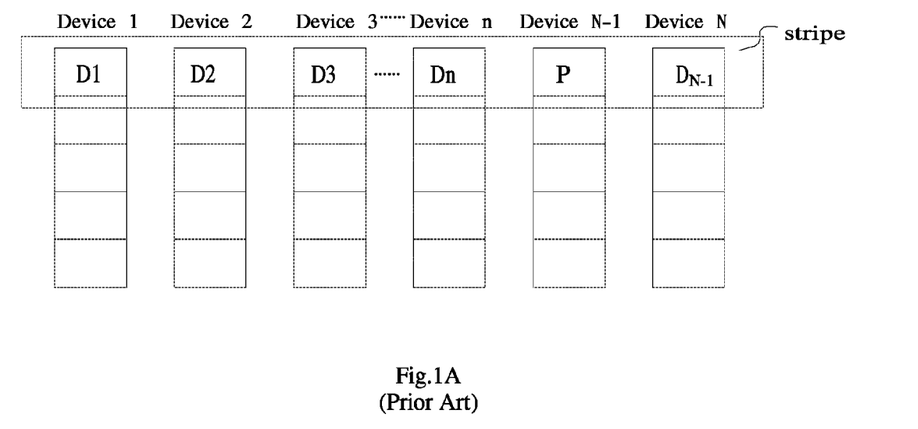
FIG. 1A (Prior Art) illustratively shows rebuilding of data chunks in RAID 5.

As mentioned above, a RAID array has data recovery capability due to its redundancy. The process of restoring data in a failed disk in RAID is also called 'rebuild'. FIG. 1A illustratively shows the rebuild of data chunks in RAID 5. In a RAID 5 having N storage devices (such as disk), there are N−1 data chunks and 1 parity chunk in each stripe. When a certain data chunk Dn corrupts, the corrupted data chunk Dn can be restored through calculation using other data chunks Di (i is not equal to n) and a corresponding parity chunk P in the same stripe. If what is corrupted is the parity chunk, then that parity chunk can be re-obtained by performing parity operation on data chunks in the same stripe again. Therefore, when any one of disks in the array fails, data in the failing disk may be restored by using data in the remaining disks. Such rebuild process is also called component rebuild. Generally, component rebuild will not influence input and output (I/O) between RAID array and hosts. However, it is appreciated that, since component rebuild needs to read data in respective disks and perform calculation thereon, it normally takes a long time (several hours). For this reason, smart rebuild is further proposed as a supplement, so as to rapidly rebuild data in a failing disk.

Figure 1B:
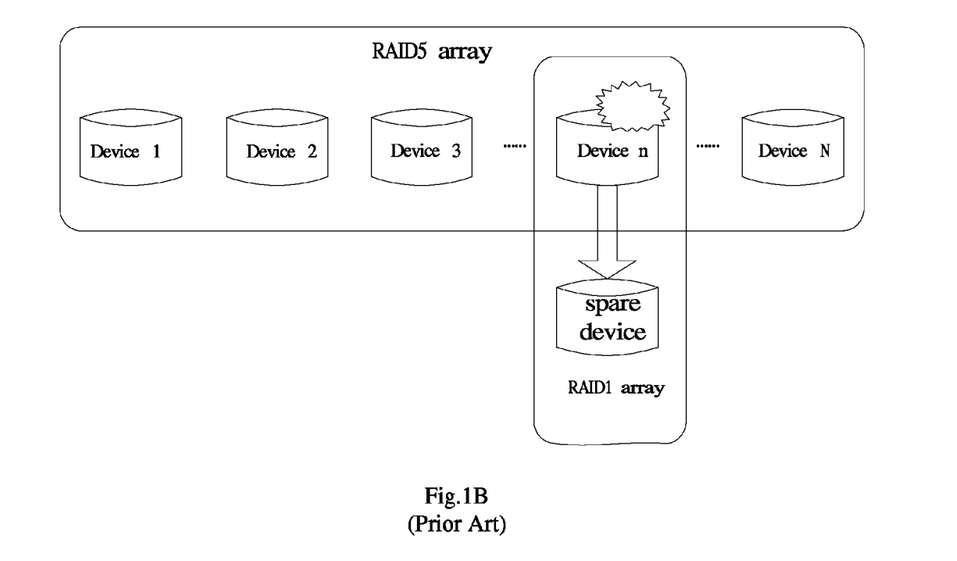
FIG. 1B (Prior Art) shows a diagram of smart rebuild.

FIG. 1B shows a diagram of smart rebuild. Smart rebuild mainly applies to the case in which a storage device begins to fail but access can still be performed. As shown in FIG. 1B, assume in a RAID 5 array formed by N storage devices (such as disk), disk n begins to fail, for example, having medium errors occurred. To avoid component rebuild, in case that disk n can still be accessed, a mirror relation is established between that disk n and a spare disk, that is, the disk n and the spare disk are made to form a RAID 1 array, so as to copy data of the disk n to the spare disk. At this point, disk n belongs to both the RAID 5 array (original array) and the RAID 1 array (mirroring array). Although FIG. 1B merely illustrates RAID 5 array as an example, smart rebuild may also be similarly applied to other RAID types such as RAID 6, RAID 10 etc. Since smart rebuild only involves data copy between the failing disk n and the spare disk, the rebuild process is much faster than component rebuild.

However, it is appreciated that, during the process of smart rebuild, the failing disk needs to be frequently accessed to copy data therefrom, which sometimes accelerates corruption of the failing disk that has medium errors occurred. Therefore, sometimes, such a case occurs: when smart rebuild has not been completed yet, the failing disk is further corrupted and data can not be read therefrom, so that smart rebuild has to be terminated. As stated above, when smart rebuild begins, a mirror relation is established between the failing disk and a spare disk. Establishment of the mirror relation involves writing of many configuration data, including metadata of the original RAID array, metadata of the mirroring array, various bitmap data etc. Accordingly, to terminate the smart rebuild, the mirror relation established between the failing disk and the spare disk needs to be removed, and the above configuration data needs to be cleared. To avoid introducing further complexity, during the time of clearing the configuration data, usually, it needs to quiesce I/O between the original RAID array and hosts, so as to ensure that correlation between the failing disk and the spare disk is cleaned up as soon as possible. In case that the failing disk is seriously damaged, the above clean up process needs a relatively long time, during which I/O between RAID and hosts of the storage array is completely suppressed, so that its read/write will be seriously affected.

Therefore, it is desired to propose a more advantageous rebuild scheme that is capable of reducing influence on a RAID array when restoring corrupted data in the array.

SUMMARY

The present invention is proposed in view of the problems existed in the art, and the purpose of which is to provide a more advantageous storage array rebuild scheme.

According to an aspect of the present invention, there is provided a method for rebuilding a storage array, comprising:

replacing, in response to a failing storage device occurs in the storage array, the failing storage device with a first spare storage device; performing component rebuild using other storage devices in the storage array than the first spare storage device, so as to restore within the first spare storage device data in the failing storage device; performing, in parallel with the component rebuild, smart rebuild using a second spare storage device outside of the storage array, so as to copy data in the failing storage device to the second spare storage device; replacing, in response to completion of the smart rebuild, the first spare storage device with the second spare storage device in the storage array.

According to another embodiment of the present invention, there is provided apparatus for rebuilding a storage array, comprising: a first replacement unit configured to replace, in response to a failing storage device occurs in the storage array, the failing storage device with a first spare storage device; a component rebuild unit configured to perform component rebuild using other storage devices in the storage array than the first spare storage device, so as to restore within the first spare storage device data in the failing storage device; a smart rebuild unit configured to perform, in parallel with the component rebuild, smart rebuild using a second spare storage device outside of the storage array, so as to copy data in the failing storage device to the second spare storage device; a second replacement unit configured to replace, in response to completion of the smart rebuild, the first spare storage device with the second spare storage device in the storage array.

With the method and apparatus of embodiments of the invention, a storage array may perform component rebuild and smart rebuild in two spare storage devices concurrently. In case that smart rebuild is successful, the storage array use smart rebuild to rapidly restore data in a failing storage device; even if smart rebuild is not successful, the storage array may perform conventional component rebuild without being affect by termination of smart rebuild. As such, the storage array can perform data rebuild and recovery more rapidly, flexibly and securely.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
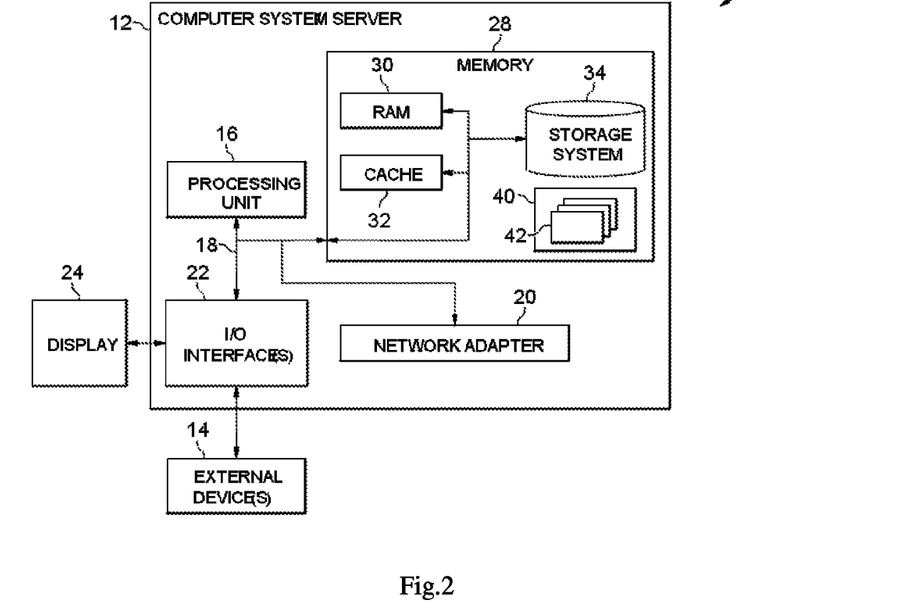
FIG. 2 shows a block diagram of an exemplary computer system/server 12 which is applicable to implement the embodiments of the present invention.

Referring now to FIG. 2, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 2, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Embodiments of the present invention will be described below in conjunction with accompany drawings and detail examples. According to embodiments of the invention, in case there is a failing storage device in a storage array, the failing storage device is replaced with a first spare storage device to perform component rebuild. Concurrently, a mirror relation is established between the failing storage device that is disengaged from the storage array and a second spare storage device, and data in the failing storage device is copied to the second spare storage device. In other words, smart rebuild is performed in parallel with component rebuild of the original storage array. Once smart rebuild completes successfully, the first spare storage device is replaced by the second spare storage device. In the event that smart rebuild cannot be completed successfully, then the process of smart rebuild is terminated. Since the failing storage device has been moved out of the original storage array, termination of the above smart rebuild process will not affect read/write of the original storage array; accordingly, component rebuild is continually performed on the original storage array until rebuild is completed. Thus, the storage array may utilize smart rebuild to rapidly restore data in the failing storage device; even if smart rebuild is not successful, termination of smart rebuild will not influence the storage array; thus, flexible, efficient and secure data rebuild can be realized. Implementations of the above inventive conception will be described in detail below.

Figure 3:
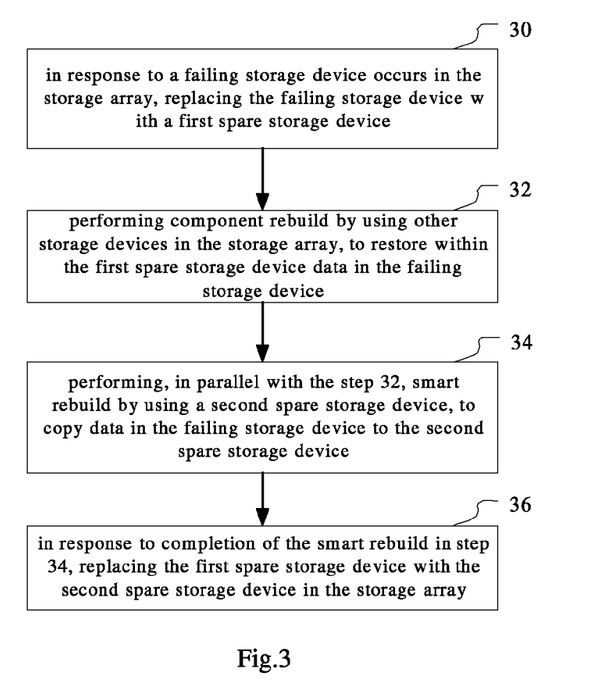
FIG. 3 shows a flowchart of a method for rebuilding a storage array according to an embodiment of the invention.

Now referring to FIG. 3, a flowchart of a method for rebuilding a storage array according to an embodiment of the invention is shown. It is appreciated that, the storage array is formed by a plurality of independent non-volatile storage devices such as disk, SSD, etc; moreover, the storage array has certain redundancy, thus having data recovery capability. When a storage device in the storage array fails, data in the failing storage device may be restored by using the method flow shown in FIG. 3, thereby rebuilding that storage array. Specifically, as shown in FIG. 3, the method for rebuilding comprising the following steps: step 30 of replacing, in response to a failing storage device occurs in the storage array, the failing storage device with a first spare storage device; step 32 of performing component rebuild by using other storage devices in the storage array than the first spare storage device, so as to restore within the first spare storage device data in the failing storage device; step 34 of performing, in parallel with the above step 32, smart rebuild by using a second spare storage device outside of the storage array, so as to copy data in the failing storage device to the second spare storage device; and step 36 of replacing, in response to completion of the smart rebuild, the first spare storage device with the second spare storage device in the storage array. Next, implementations of the above steps will be described in conjunction with detailed examples.

Specifically, first, at step 30, in response to a failing storage device occurs in the storage array, the failing storage device is replaced with a first spare storage device. It is appreciated that, the above failing storage device is a storage device in which certain amount of medium errors has occurred but to which access can still be performed. As is known to those skilled in the art, medium error generally refers to read/write error in medium (e.g., disk) of a storage device. Medium error can reflect operating condition of storage medium of the storage device. Occurrence of medium error does not mean that the storage device must be replaced, since the storage device can mask and migrate a killsector. However, generally, the storage device should be diagnosed based on the medium error, so as to judge whether the storage device can continue to operate in the storage array. Accordingly, in one embodiment, the above method for rebuilding further comprises: detecting a failing storage device in the storage array. The above failing storage device may be detected by various manners in the art. In an example, manufacturer of the storage device may set an alarm threshold for medium errors that can be tolerated by the storage device. When amount of media errors occurred on a storage device exceeds the preset alarm threshold, the storage device will issue an alarm. Accordingly, detection of failing storage device can be realized by monitoring the operating status of each storage device in a storage array, and determining a storage device that issues an alarm as a failing storage device. In another example, a controller of the storage array may perform and collect statistics about medium errors occurred on each storage device, and determine a storage device whose medium error exceeds a threshold as a failing storage device. In addition, failing storage device in a storage array may also be detected through other manners in the art.

Once a failing storage device is detected, at step 30, the failing storage device is replaced by a first spare storage device. In an embodiment, the above replacement comprises: moving the failing storage device out of the storage array, integrating the first spare storage device that is free into the storage array, and making the first spare storage device take the place of the failing storage device in the storage array. To realize the above replacement, controller of the storage array needs to modify control information of the array stored in the controller. In addition, array configuration information stored in each storage device also needs to be modified.

Figure 4:
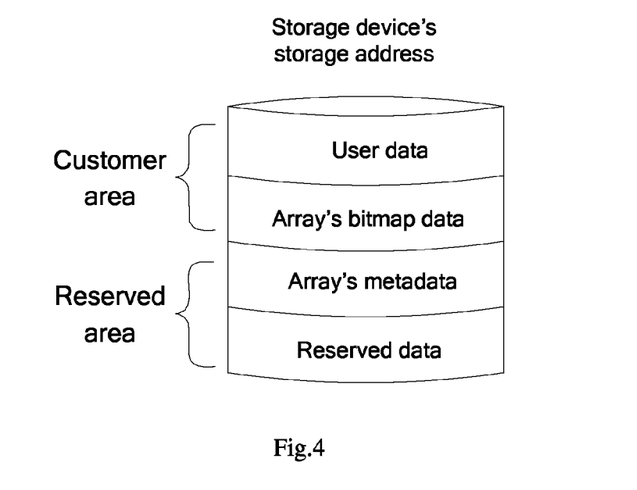
FIG. 4 shows data storage structure of a storage device according to an embodiment of the invention.

FIG. 4 shows data storage structure of a storage device according to an embodiment of the invention. The storage device may be any one of storage devices in the storage array. As shown, the storage device is partitioned into a customer area for storing user data and array's bitmap data and a reserved area for storing array's metadata and underlying reserved data. Among these data, array's bitmap data records usage status of medium in the storage device in form of a bitmap. Array's metadata records configuration information of the storage array, such as number of storage devices contained in the array, identification of each storage device etc. Since array's metadata records configuration information of the storage array, when replacement of storage devices is performed in the array, metadata of that array needs to be modified. More specifically, information about the failing storage device is modified as information of the first spare storage device. Although FIG. 4 shows a typical data storage structure, it is also possible for a storage device to employ other structure to realize data storage. For example, a storage device may further divide configuration data and store the data in different locations. Accordingly, configuration information may be modified corresponding to different storage structure so as realize replacement of storage device. Through the above replacement, the failing storage device is fully disengaged from the original storage array and is no longer a member thereof; whereas the first spare storage device takes the place of the failing storage device and becomes a member of the storage array.

Next, on basis of the replacement performed at step 30, steps 32 and 34 are performed in parallel.

At step 32, component rebuild is performed by using other storage devices in the storage array than the first spare storage device, thereby restoring within the first spare storage device data in the failing storage device. As stated above, the storage array has certain redundancy, thus having data recovery capability. Specifically, in the storage array, except the newly integrated first spare storage device, all the other storage devices normally store data in data chunks and parity chunk. By performing calculation on data chunks and parity chunk in these normally operating storage devices, data originally stored in the removed failing storage device can be obtained. The restored data is stored in the first spare storage device. It is appreciated that, this process is similar to the conventional component rebuild in the art, and description of which will be omitted here.

In parallel with step 32, at step 34, smart rebuild is performed by using a second spare storage device outside of the storage array. More specifically, the smart rebuild at step 34 refers to a process of forming a mirror array by the failing storage device and the second spare storage device and copying data in the failing storage device to the second spare storage device. It is appreciated that, the process of step 34 is similar to that of conventional smart rebuild, and thus it will still be referred to as smart rebuild. However, it should be noted that, the smart rebuild of step 34 differs from the smart rebuild in prior art in that it is performed outside of the storage array, and thus is isolated from operations of the storage array.

Figure 5:
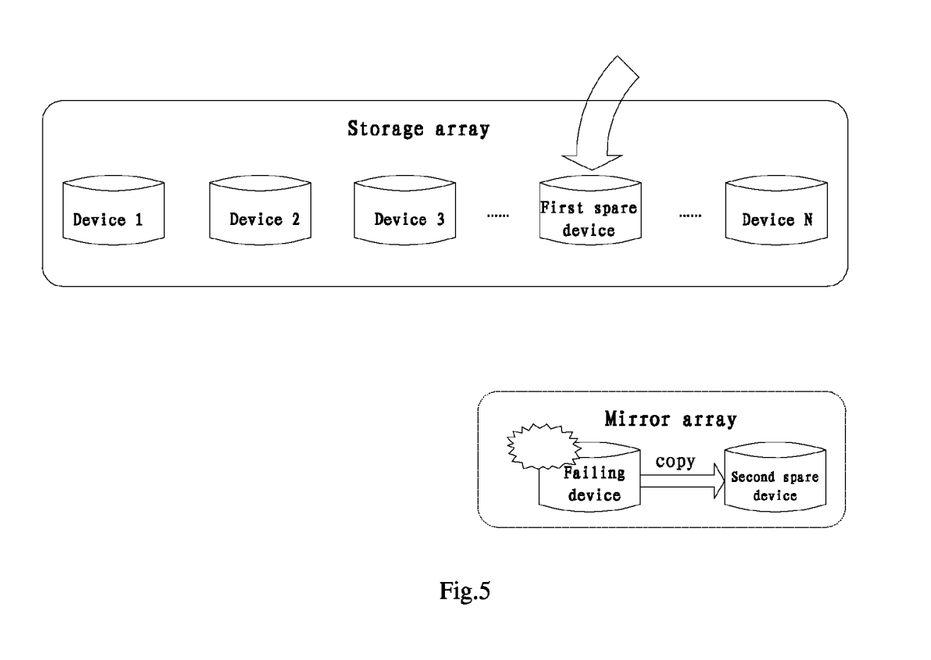
FIG. 5 shows a structural diagram of a storage array during rebuilding.

FIG. 5 shows a structural diagram of the storage array during rebuild. As shown, through step 30, the failing storage device is moved out of the storage array, and the first spare storage device has taken the place of the failing storage device and becomes a member of the storage array. Thus, component rebuild may be performed in the storage array. On the other hand, the failing storage device that has been moved out of the storage array and the second spare storage device form a mirror array, so as to perform smart rebuild. Unlike the prior art in which the failing storage device belongs to both the original storage array and the mirror array for smart rebuilding, in FIG. 5, the failing storage device is completely disengaged from the storage array and is only located in the mirror array. Thus, component rebuild in the storage array and smart rebuild in the mirror array can be performed in parallel at the same time without affecting each other or interfering with each other. The storage array even does not be aware of performance of the smart rebuild.

As is known to those skilled in the art, during component rebuild, the storage array can still conduct data read/write in response to command from a host. The component rebuild usually will take a few hours, depending on configuration of the storage array and I/O with the hosts. Whereas the above smart rebuild does not have I/O pressure with the host and only involves copying of data and. thus, it will only take several tens of minutes if it could be completed successfully, which is much faster than component rebuild. Taking a 600G hard disk with write speed of 480 MB/s for example, component rebuild usually will take 4-6 hours by taking I/O pressure into account. If the above smart rebuild is performed independently as shown in FIG. 5, only 600G/480M/60=21 minutes will be needed under an ideal condition that write is done at full speed.

Since in most cases, process of the above smart rebuild will be completed much earlier than component rebuild, after component rebuild and smart rebuild begin in parallel at steps 32 and 34, performance status of smart rebuild conducted on the failing storage device is detected. For this reason, in an embodiment, operating status of the failing storage device is monitored. If the failing storage device is conducting data copy toward the second spare storage device, then it is determined that smart rebuild is still in progress; if the failing storage device has completed copying all the data, then it is determined that smart rebuild has been finished successfully; if the failing storage device stops data copy due to being seriously damaged, then it is determined that smart rebuild has failed. Thus, performance status of smart rebuild is detected by monitoring operating status of the failing storage device. In another embodiment, the failing storage device is configured to issue a notification when data copy has been completed and/or data copy has been forced to stop. Performance status of smart rebuild may be detected by receiving the notification from the failing storage device. Additionally, those skilled in the art may employ other manners to detect performance status of the above smart rebuild.

In an embodiment, the method for rebuilding in FIG. 3 further comprises: terminating the smart rebuild in response to failure of the smart rebuild, that is, in response to failure of data copy from the failing storage device to the second spare storage device. In an embodiment, terminating the smart rebuild comprises: clearing the mirror relation between the failing storage device and the second spare storage device. In another embodiment, to terminate the smart rebuild, the second spare storage device is directly moved out of the mirror array formed by the second spare storage device and the failing storage device, and is then released as a free storage device without performing operation on configuration data such as any metadata, bitmap data any more. No matter which manner is employed, the process of terminating the smart rebuild is isolated from the original storage array, and thus would not impose any influence on the original storage array. Accordingly, the original storage array may continue to perform its component rebuild until the rebuild is completed.

Figure 6A:
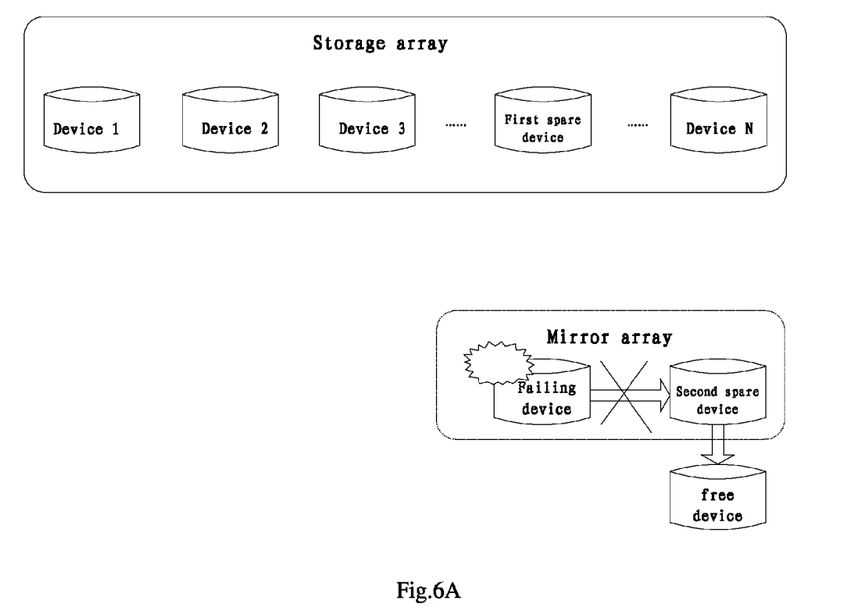
FIG. 6A shows a structural diagram of a storage array on which component rebuild has been performed.

FIG. 6A shows a structural diagram of a storage array on which component rebuild has been performed. As shown, in case that smart rebuild fails, the storage array performs data recovery via component rebuild. The finally rebuilt storage array is an array in which the failing storage device is replaced by the first spare storage device. Accordingly, after being temporarily used, the second spare storage device re-becomes a free spare storage device. During the whole process, the storage array independently performs component rebuild, being completely unaware of the process of starting and ending smart rebuild, thus avoiding influence due to smart rebuild.

On the other hand, if smart rebuild is completed successfully, then the second spare storage device has acquired all the data stored in the failing storage device. Since data in the failing storage device has been restored, there is no need to continue to perform component rebuild in the storage array. Thus, at step 36, once smart rebuild is completed successfully, that is, once data copy from the failing storage device to the second spare storage device has been completed, component rebuild using the first spare storage device will be terminated, and the first spare storage device is replaced by the second spare storage device. Similar to the replacement in step 30, step 36 comprises: moving the first spare storage device out of the storage array, integrating the second spare storage device into the storage array, and making the second spare storage device take the place of the first spare storage device in the storage array. Thus, in case that smart rebuild is successful, replacement is performed twice at step 30 and step 36 respectively, after which the place of the initial failing storage device is finally replaced by the second spare storage device. Accordingly, the first spare storage device is moved out of the storage array and re-becomes a free spare storage device.

Figure 6B:
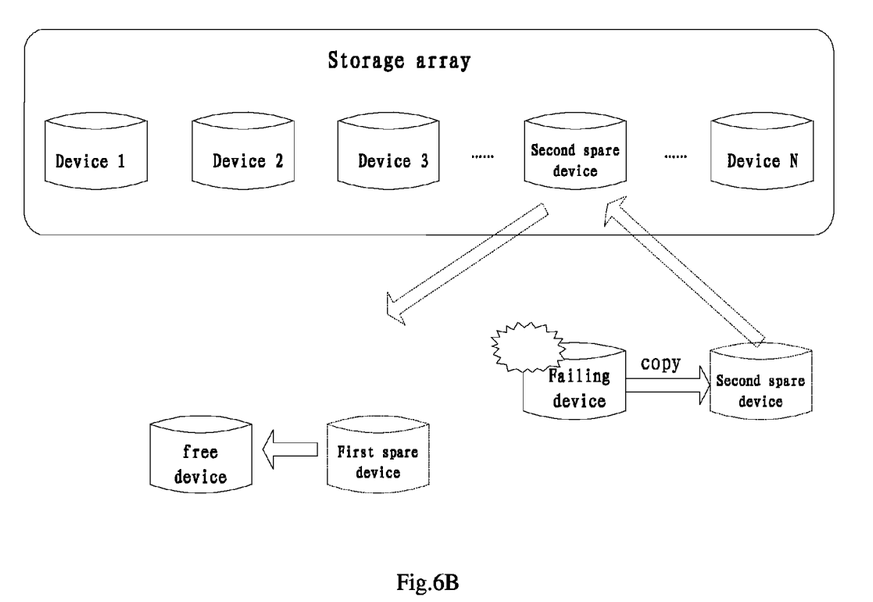
FIG. 6B shows a structural diagram of a storage array on which smart rebuild has been performed.

FIG. 6B shows a structural diagram of a storage array on which smart rebuild has been performed. As shown, in case that smart rebuild is successful, the finally rebuilt storage array is an array in which the failing storage device is replaced by the second spare storage device. Accordingly, the first spare storage device is released after being temporarily used in component rebuild and re-becomes a free spare storage device. Time consumed in the whole rebuild process is equivalent to that of smart rebuild. Thus, the storage array rapidly restores data in the failing storage device by utilizing smart rebuild; meanwhile, since performance of smart rebuild is isolated from the storage array, it is ensured that the storage array will not be affected by the smart rebuild.

In an embodiment, on basis of integrating the second spare storage device into the storage array, data integrity issue that may arise during rebuild process is further considered. The data integrity issue may be introduced by the following factors. Because the second spare storage device directly copies data from the failing storage device, and there are already some medium errors in the failing storage device, accordingly, there are some erroneous data in the data obtained by the second spare storage device. On the other hand, the second spare storage device is integrated into the storage array only after smart rebuild is completed. During the time in which the second spare storage device is performing smart rebuild, the storage array implements component rebuild while normally performs I/O communication with hosts, and thus may have new data written. All these factors may cause integrity issue in data of the second spare storage device. For this reason, the method for rebuilding in FIG. 3 may further comprise: updating data in the second spare storage device in response to completion of replacing the first spare storage device with the second spare storage device.

In an embodiment, the step of updating comprises correcting erroneous data in the second spare storage device. As described above in connection with FIG. 4, storage devices in the storage array store therein array's bitmap data that records, in form of bitmap, utilization status of medium in respective storage devices, such as which sectors have been used, which sectors have not been used, which sectors have error therein etc. In the data copy process of step 34, the second spare storage device also copies array's bitmap data stored in the failing storage device. As such, the second spare storage device contains such array's bitmap data. Based on the array's bitmap data, the second spare storage device is able to determine which of the copied data chunk has errors therein. Accordingly, after the second spare storage device has been integrated into the storage array, based on the aforementioned storage array's data recovery capability, the above data chunk having error therein may be rebuilt by utilizing corresponding data chunks within other storage devices in the storage array, thereby correcting the erroneous data. It is appreciated that, in other embodiments, the storage device may also employ other forms to record utilization status of medium, for example, in the form of a killsector table containing a plurality of entries, each of which records information of one killsector. No matter what form is employed, a storage device can always record utilization status of medium. Based on information that records utilization status of medium in the failing storage device, data chunk having errors therein may be determined, and thus erroneous data in the second spare storage device can be corrected.

In an embodiment, the step of updating further comprises: restoring, within the second spare storage device, data newly written to the first spare storage device during the smart rebuild performed at step 34. The above data restoring may also be realized by referring bitmap data.

In general, when conventional component rebuild is performed using the first spare storage device, a rebuild bitmap and a parity bitmap will be maintained in the first spare storage device. In an example, all bits in the rebuild bitmap are initially set to 1. It is appreciated that, during component rebuild, data recovery is performed stripe by stripe. Whenever data rebuild for a stripe is completed, value of a bit corresponding to that stripe in the rebuild bitmap is re-write such as to 0. On such basis, according to an embodiment of the invention, a new write bitmap may be further created in the first spare storage device. In an example, initially, all the bits in that new write bitmap are set to '0'. Once data of a certain stripe is newly written from a host during component rebuild, then in the new write bitmap, a bit corresponding to that newly written stripe is modified as '1'. When the first storage device is moved out of the storage array, the new write bitmap is firstly read therefrom and is recorded. Based on that new write bitmap, it may be determined which stripes of the storage array have been updated during component rebuild. Next, after the second spare storage device has been integrated into the storage array, it is possible to restore data newly written to the first spare storage device by utilizing data chunks in a same stripe within other storage devices of the storage array, and to write the restored data to the second spare storage device. As such, data newly written to the first spare storage device during the data copy process of step 34 is restored in the second spare storage device.

In an example, the first spare storage device may be made to record data chunks restored during component rebuild and newly written data chunks in a same bitmap file. When the first spare storage device is replaced with the second spare storage device, it is possible to determine whether there is newly written data chunk by comparing bitmap data in the two spare storage devices. Next, similarly, after the first spare storage device has been moved out, the above newly written data chunk is restored within the second spare storage device by utilizing data chunks in other storage devices.

As mentioned above, in other embodiments, utilization status of medium in storage devices may also be recorded by employing other forms than bitmap, so as to determine information of newly written data chunks. Based on the determined information of newly written data chunks, the newly written data may be restored in the second spare storage device.

Since data correction and data recovery have been performed above in the second spare storage device, in an embodiment, the step of updating further comprises updating bitmap information of the second spare storage device. In a specific example, when the first spare storage device is replaced with the second spare storage device, bitmap information in the two spare storage devices are combined so as to form updated bitmap information in the second spare storage device. In another example, bitmap information is rebuilt based on the updated data in the second spare storage device.

By updating the second spare storage device as above, data integrity of the storage array is ensured. Generally, the smart rebuild of step 34 only takes several tens of minutes, so there will not be significant data write in this period of time. On the other hand, if smart rebuild could be successfully completed, then generally, corruption of the failing storage device is not very serious, and the amount of erroneous data therein is very limited. Therefore, typically, time consumed for the above update step won't be very long. According to configuration of a typical existing storage array, even in a case in which update step is performed, total time of rebuilding the whole storage array will not exceed 1 hour, which has obvious advantage over 4-6 hours required by full component rebuild.

Detailed process of implementations of embodiments of the invention has been described above in connection with specific examples. It is appreciated that, the method of embodiments of the invention is not only applicable to a RAID 5 array, but also to other storage array, as long as that storage array has sufficient redundancy to restore corrupted data. For example, for a RAID 6 array, if one storage device in the array fails, then by fully referring to the above example, array rebuild may be performed by utilizing two (first and second) spare storage devices. If two storage devices in RAID 6 fail simultaneously, then for each failing storage device, two spare storage devices are used to perform rebuild, that is, using four spare storage devices altogether to perform array rebuild. After rebuild is finished, two of the spare storage devices are released. For RAID 10, the above rebuild process may be implemented for failing storage devices one by one. For other storage array, upon reading teaching of the present description, those skilled in the art may employ a similar method that performs component rebuild and smart rebuild in parallel to accomplish data recovery and array rebuild.

Figure 7:
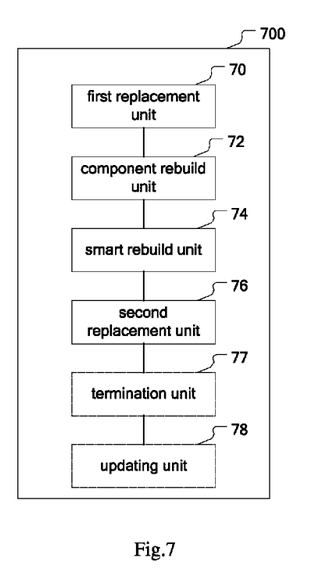
FIG. 7 shows a block diagram of an apparatus according to an embodiment of the invention.

Under a same inventive conception, embodiments of the invention also provide an apparatus for rebuilding a storage array. FIG. 7 shows a block diagram of an apparatus according to an embodiment of the invention. As shown, the apparatus is generally denoted as 700 and comprises: a first replacement unit 70 configured to replace, in response to a failing storage device occurs in the storage array, the failing storage device with a first spare storage device; a component rebuild unit 72 configured to perform component rebuild by using other storage devices in the storage array than the first spare storage device, thereby restoring within the first spare storage device data in the failing storage device; a smart rebuild unit 74 configured to perform, in parallel with operation of the component rebuild unit 72, smart rebuild by using a second spare storage device outside of the storage array, thereby copying data in the failing storage device to the second spare storage device; a second replacement unit 76 configured to replace, in response to completion of the smart rebuild, the first spare storage device with the second spare storage device in the storage array.

According to an embodiment, the first replacement unit 70 is configured to: move the failing storage device out of the storage array, integrate the first spare storage device into the storage array, and make the first spare storage device take the place of the failing storage device in the storage array.

According to an embodiment, the apparatus 700 further comprises a detection unit (not shown) configured to detect performance status of the smart rebuild.

In an embodiment, the apparatus 700 further comprises a termination unit 77 (shown in dashed line) configured to terminate the smart rebuild in response to failure of the smart rebuild.

In an embodiment, the termination unit 77 is configured to: move the second spare storage device out of a mirror array formed by the second spare storage device and the failing storage device, and release the second spare storage device as a free spare storage device.

According to an embodiment, the second replacement unit 76 is configured to: move the first spare storage device out of the storage array, integrate the second spare storage device into the storage array, and make the second spare storage device take the place of the first spare storage device in the storage array.

According to an embodiment, the apparatus 700 further comprises an updating unit 78 (shown in dashed line) configured to update data in the second spare storage device in response to completion of replacement by the second replacement unit.

In an embodiment, the updating unit 78 is further configured to correct erroneous data in the second spare storage device.

In an embodiment, the updating unit 78 is further configured to restore, within the second spare storage device, data newly written to the first spare storage device during the smart rebuild.

In an embodiment, the updating unit 78 is further configured to update bitmap information of the second spare storage device.

In an embodiment, the apparatus 700 is contained in an existing storage array controller. In another embodiment, the apparatus 700 is implemented as a standalone control tool coupled to and in communication with an existing storage array controller.

For detailed implementation of the above apparatus 700, reference may be made to the method described in connection with specific examples, and the description of which will be omitted here.

With the method and apparatus of embodiments of the invention, a storage array may utilize smart rebuild to rapidly restore data while avoiding the risk that access of the storage array is affected in case that smart rebuild is not successful, thereby realizing flexible, efficient and secure data rebuild.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for rebuilding a storage array, comprising:
    replacing, in response to a failing storage device occurs in the storage array, the failing storage device with a first spare storage device;
    performing component rebuild by using other storage devices in the storage array than the first spare storage device, so as to restore within the first spare storage device data in the failing storage device;
    performing, in parallel with the component rebuild, smart rebuild by using a second spare storage device outside of the storage array, so as to copy data in the failing storage device to the second spare storage device; and
    replacing, in response to completion of the smart rebuild, the first spare storage device with the second spare storage device in the storage array.

2. The method of claim 1, wherein the step of replacing the failing storage device with a first spare storage device comprises: moving the failing storage device out of the storage array, integrating the first spare storage device into the storage array, and making the first spare storage device take the place of the failing storage device in the storage array.

3. The method of claim 1, further comprising: detecting performance status of the smart rebuild.

4. The method of claim 1, further comprising: terminating the smart rebuild in response to failure of the smart rebuild.

5. The method of claim 4, wherein the step of terminating the smart rebuild comprises: moving the second spare storage device out of a mirror array formed by the second spare storage device and the failing storage device, and releasing the second spare storage device as a free spare storage device.

6. The method of claim 1, wherein the step of replacing the first spare storage device with the second spare storage device comprises: moving the first spare storage device out of the storage array, integrating the second spare storage device into the storage array, and making the second spare storage device take the place of the first spare storage device in the storage array.

7. The method of claim 1, further comprising: updating data in the second spare storage device in response to completion of replacing the first spare storage device with the second spare storage device.

8. The method of claim 7, wherein the step of updating data in the second spare storage device comprises: correcting erroneous data in the second spare storage device.

9. The method of claim 7, wherein the step of updating data in the second spare storage device comprises: restoring, within the second spare storage device, data newly written to the first spare storage device during the smart rebuild.

10. The method of claim 7, wherein the step of updating data in the second spare storage device comprises: updating bitmap information of the second spare storage device.

11. An apparatus for rebuilding a storage array, comprising:
   a first replacement unit configured to replace, in response to a failing storage device occurs in the storage array, the failing storage device with a first spare storage device;
   a component rebuild unit configured to perform component rebuild by using other storage devices in the storage array than the first spare storage device, so as to restore within the first spare storage device data in the failing storage device;
   a smart rebuild unit configured to perform, in parallel with the component rebuild, smart rebuild by using a second spare storage device outside of the storage array, so as to copy data in the failing storage device to the second spare storage device;
   a second replacement unit configured to replace, in response to completion of the smart rebuild, the first spare storage device with the second spare storage device in the storage array.

12. The apparatus of claim 11, wherein the first replacement unit is configured to: move the failing storage device out of the storage array, integrate the first spare storage device into the storage array, and make the first spare storage device take the place of the failing storage device in the storage array.

13. The apparatus of claim 11, further comprising a detection unit configured to detect performance status of the smart rebuild.

14. The apparatus of claim 11, further comprising a termination unit configured to terminate the smart rebuild in response to failure of the smart rebuild.

15. The apparatus of claim 14, wherein the termination unit is configured to: move the second spare storage device out of a mirror array formed by the second spare storage device and the failing storage device, and release the second spare storage device as a free spare storage device.

16. The apparatus of claim 11, wherein the second replacement unit is configured to: move the first spare storage device out of the storage array, integrate the second spare storage device into the storage array, and make the second spare storage device take the place of the first spare storage device in the storage array.

17. The apparatus of claim 11, further comprising an updating unit configured to update data in the second spare storage device in response to completion of replacement by the second replacement unit.

18. The apparatus of claim 17, wherein the updating unit is further configured to correct erroneous data in the second spare storage device.

19. The apparatus of claim 17, wherein the updating unit is further configured to restore, within the second spare storage device, data newly written to the first spare storage device during the smart rebuild.

20. The apparatus of claim 17, wherein the updating unit is further configured to update bitmap information of the second spare storage device.

* * * * *